July 22, 1924.

G. C. MARTIN 1,502,150

REVERSING MECHANISM

Original Filed July 31, 1920   2 Sheets-Sheet 1

Inventor
George Cushing Martin
by
James R. Townsend
his atty

Witness
C. C. Reilly

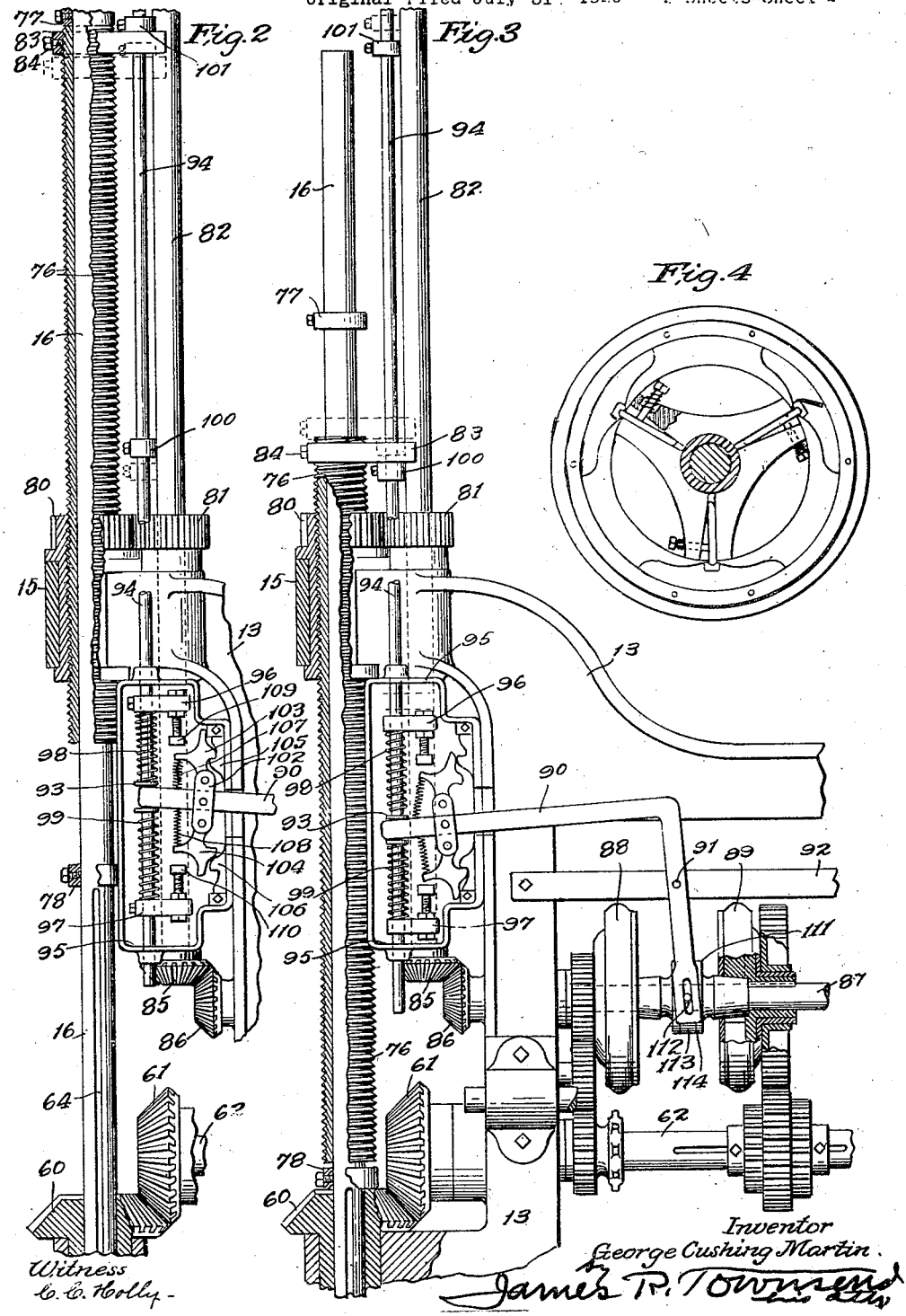

Patented July 22, 1924.

1,502,150

UNITED STATES PATENT OFFICE.

GEORGE CUSHING MARTIN, OF LOS ANGELES, CALIFORNIA.

REVERSING MECHANISM.

Original application filed July 31, 1920, Serial No. 400,525. Divided and this application filed April 18, 1922. Serial No. 555,482.

*To all whom it may concern:*

Be it known that I, GEORGE CUSHING MARTIN, a citizen of the United States, residing at Los Angeles, in the county of Los Angeles and State of California, have invented a new and useful Reversing Mechanism, of which the following is a specification.

This invention relates to means adapted for operating centre heads and troweling devices in concrete pipe machines and for other purposes in which it is desired to give a shaft both rotary and endwise movement at the same time and to reverse the endwise movement of such shaft.

This application is a division of my application Serial No. 113,360, filed August 5, 1916, for concrete pipe machine. Renewed July 31, 1920, Serial No. 400,525.

An object of this invention is to provide effective automatic means for operating a shaft in the manner stated.

Other objects are simplicity, certainty of action, and ease of control. Features of invention reside in the various parts and combinations of parts as will more fully hereinafter appear.

Other objects, advantages and features of invention may appear from the accompanying drawings, the subjoined detail description and the appended claims.

The accompanying drawings illustrate the invention.

Fig. 2 is an enlarged broken and partly sectioned elevation of some of the parts going to make up this invention, showing the same shifted to reverse position for lowering the travelling shaft.

Fig. 3 is a broken view partly in vertical section showing the clutch engaged for the troweling operation.

Fig. 4 is a view partially in section of one of the friction devices or clutch mechanisms employed in controlling the reciprocation of the vertical shaft shown in Fig. 1.

Figure 1:
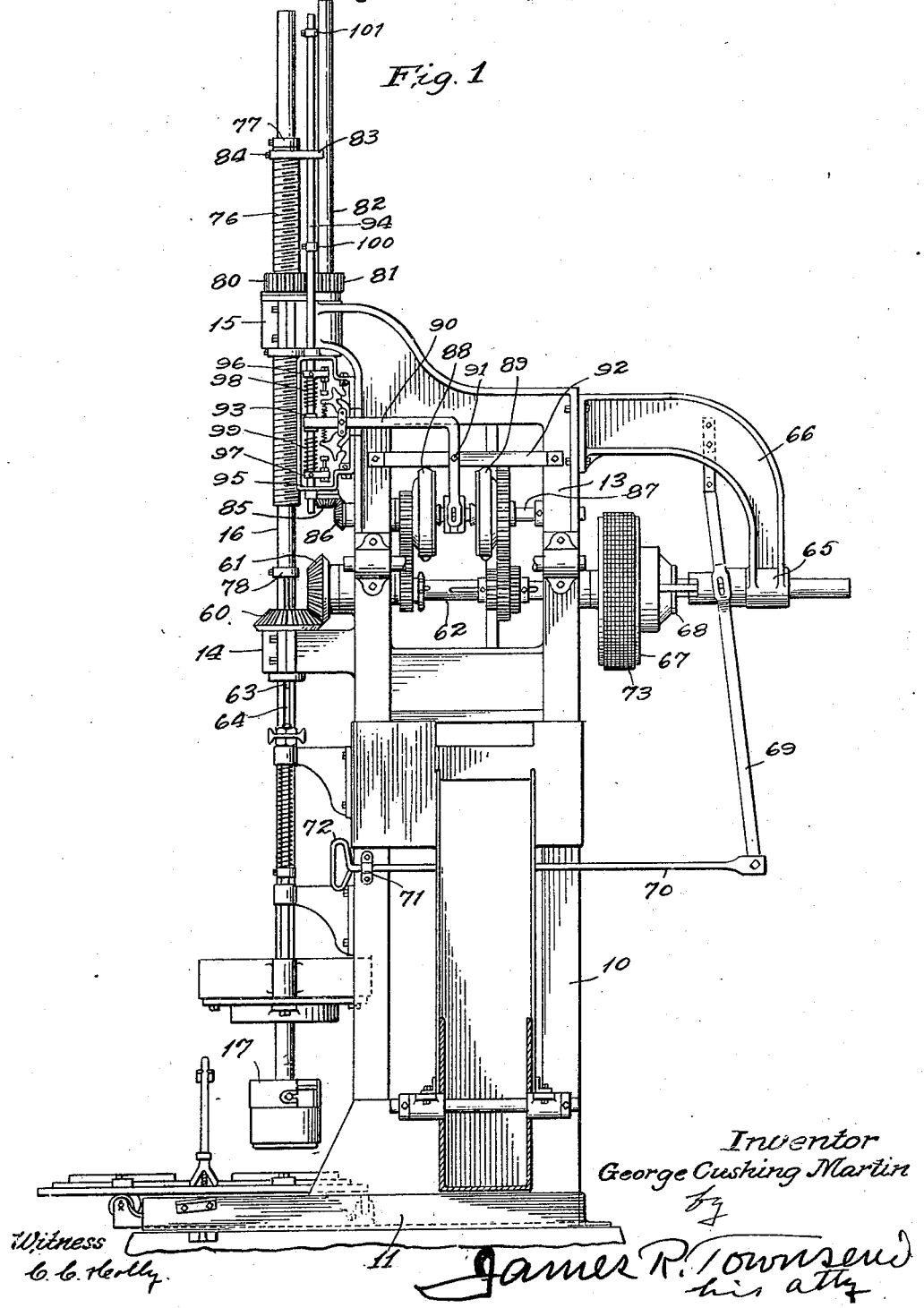
Figure 1 is an elevation of a reversing mechanism constructed in accordance with this invention and arranged for use in a concrete pipe machine of which it constitutes a part. The clutch is shown at neutral position.

Reference is made to my application for clutch, Serial No. 552,387. Filed April 13, 1922, as a further division of the parent application.

Referring to Fig. 1, I have shown a frame 10 formed preferably of angle iron or like bars and having a base 11. The upper end of the frame 10 has a standard or casting 13 rising centrally therefrom and provided with brackets carrying bearings 14 and 15 within which operates the shaft 16 to the lower end of which is shown attached, the pipe shaping device 17.

60 is a bevelled gear secured upon the shaft 16 and meshing with another bevelled gear 61 carried upon the end of a power shaft 62. The gear 60 is mounted on the bearing 14 and is connected with shaft 16 by means of a spline or feather as at 63 which engages a groove 64 of said shaft so that said shaft may be moved endwise without interfering with its rotation by operation of the gear 60.

The power shaft 62 is journalled in suitable bearings on standard 13, and projects beyond said standard, is journalled in a bearing 65 carried by a bracket 66 supported by said standard, and is provided with a loose pulley 67 between said standard and the bearing 65.

The pulley 67 loose on power shaft 62, is adapted to be connected with said shaft by suitable clutch mechanism 68 so as to be revolved thereby. Said clutch mechanism is arranged to be moved into and out of pulley engaging position by means of a lever 69 which is pivotally supported on the bracket 66 and which has a thrust rod 70 pivoted to its lower end and operating through guides 71 upon the frame 10 for the purpose of moving the clutch mechanism 68 into and out of position for connecting the pulley 67 with the shaft 62 to drive said shaft. Said thrust rod is provided with a handle 72 by which it may be operated.

The pulley 67 is adapted to receive power from any desired source for operating the machine.

73 indicates a power belt for driving the pulley 67.

Wherever the parts above enumerated, are shown in the other views they are indicated by characters corresponding to those applied in Fig. 1.

In the application of the invention as shown, the shaft 16 is vertical, and reciprocation of the same is up and down, and the parts are shown as being so arranged that the movement will be slower and its power for rotation will be greater on the upward than on the downward movement; but various combinations of gears may be had for such relative speeds as may be desired or deemed advisable. 76 is a hollow feed screw fitted upon the shaft member 16 which is adapted for rotary and enwise movement. The feed screw 76 is mounted for endwise movement and is adapted to move said shaft longitudinally relative to the frame and to permit said shaft to be rotated. The shaft is provided above and below the hollow feed screw with collars or stops 77 and 78 fixed to the shaft at greater distances apart than the length of said feed screw to permit the shaft to move longitudinally relative to said screw. The lower collar 78 is adapted to be stopped by and to rest upon the bevel gear 60 at the lowest position of shaft 16 and during the ascent of the feed screw across the open lost motion space caused by the difference between the length of the feed screw and the space between the collars 77 and 78. The feed screw is supported and reciprocated vertically by an internally threaded spur gear 80 carried and supported against end thrust or endwise movement by the upper bearing 15 and driven by a gear 81 which is driven by shaft 82. A guide piece 83 is fixed to the feed screw 76 by a set screw 84 and embraces and slides along the shaft 82, and serves to hold the feed screw against rotation so that the rotation of the internally threaded gear 80 will move the hollow screw up or down according to the direction in which the shaft 82 is revolved by the bevel gears 85, 86 driven by shaft 87 which is arranged counter to the power shaft 62 and is mounted in a bearing in the standard 13 and is adapted to be alternately rotated in one and the other direction by reverse trains of gears which connect with the power shaft 62 through friction clutch mechanisms 88, 89 by means of which the trains of gears may be alternately connected to counter shaft 87. Said trains are constructed and arranged to rotate the shaft 87 in reverse directions according to which train is clutched to shaft 87. The clutch mechanisms are alternately thrown into operation by a lever 90 which is pivoted at 91 to a cross bar 92 on to the standard 13. In the construction shown, the lever 90 is bent somewhat in the form of a bell crank and is pivoted at 91 to a cross bar 92 on the standard 13. The free end of the lever 90 engages a sleeve 93 that is movable up and down on a trip rod 94 having bearings in the frame 95 which is secured upon the standard 13.

Said trip rod 94 carries trip blocks 96, 97 between which and the sleeve 93, are helical springs 98, 99 which surround the trip rod 94. The combined lengths of the sleeve 93 and springs 98, 99 is less than the total distance between the trip blocks 96 and 97 so that upper spring 98 is only active during the latter portion of the downward movement of the trip rod 94, and spring 99 is only active during the latter part of the upward movement of said rod. At the final upward movement of said trip rod the spring 99 will force the end of lever 90 up and vice versa, on the downward movement the spring 98 will force the end of the lever 90 down.

The trip rod 94 is provided with collars 100, 101 operable by the guide piece 83 to raise and lower the trip rod at the upper and lower limits of movement of the feed screw 76.

In order to maintain the clutch in proper clutch operating position for effecting a trowling or reverse movement as the case may be, the forward free end of the lever 90 carries a double latch mechanism made up of a yoke 102 which is secured to the lever 90 and projects a sufficient distance above and below the same to pivotally carry latches 103 and 104 that are adapted to engages keepers 105 and 106 alternately for holding said lever in its extreme positions. The latches are normally pressed toward the keepers by springs 107 and 108 which bear against the outer end of the said lever 90 and extend to heel portions formed upon the latches. The trip blocks 96 and 97 have adjustable bolts 109 and 110 projecting inwardly therefrom and adapted to alternately strike the heels of the said latches, whereby they will be moved against their springs for disconnecting the latches from the keepers. The structure is such that when the trip rod 94 is moved downwardly by the feed screw 76, the upper latch will be struck by the bolt 109 and released from its keeper, permitting the lever 90 to drop. The spring 98 will have been compressed before the release of the latch against the sleeve 93 so that when the latch 103 is raised, the spring 98 will throw the lever 90 downwardly with a positive action. The lower latch 104 will then engage the keeper 106 and hold the said lever downwardly. As the trip rod 94 is carried upwardly by the feed screw, the spring 99 will come in contact with the said sleeve 93 and as soon as the lower latch is released by the bolt 110, said spring will throw the lever upwardly again. This movement of the lever 90 will be communicated to a double conical wedge device or member 111, which extends into the adjacent clutch devices 88 and 89. The lower end of the said lever 90 is slotted and engages a pin 112 carried by a sleeve 113 which is loosely mounted in a groove 114 in the central part of said conical wedge device, so that the lever is adapted to move said wedge back and forth to operate the friction clutch mechanism.

I claim:

1. In combination with a shaft journaled in bearings, said shaft being adapted for rotary and endwise movement in said bearings; means operated at each end of the path of movement of said shaft for reversing the direction of said shaft; said means comprising a rod, a sleeve slidable on said rod; a lever attached by one arm to the sleeve; a drive shaft; a countershaft; driving connections between the drive shaft and countershaft; said driving connections being adapted to be alternately brought into action to drive the countershaft in opposite directions; means for bringing the driving connections alternately into action comprising clutch devices associated respectively with each of the drive connections, and a wedge device reciprocated by said lever to bring the clutches into action; and means operable by the lever for locking the wedge in operative position.

2. In combination with a frame, a shaft and bearings for said shaft, said shaft being mounted for rotary and longitudinal movement in said bearings; means adapted to reverse the longitudinal movement of said shaft; said means comprising a feed screw; a countershaft connected to rotate said feed screw; a trip rod; a sleeve slidable on said rod; a level pivotally connected intermediate its ends to said frame and having one end attached to said sleeve; means adapted to drive the countershaft in opposite directions and comprising clutch members rotating in opposite directions; and means operable by said trip rod and lever to alternately bring said clutch members into action to rotate the countershaft and feed screw.

3. In combination with a frame, a shaft and bearings for said shaft, said shaft being mounted for rotary and longitudinal movement in said bearings means adapted to reverse the longitudinal movement of said shaft and comprising a feed screw; a countershaft connected to rotate said feed screw; means adapted to drive the countershaft in opposite directions and comprising clutch members rotating in opposite directions; a trip rod; a lever operable by said trip rod and means operable by said trip rod and lever to alternately bring one of said clutch members into action to drive the countershaft and feed screw.

4. In combination with a shaft mounted for rotary and longitudinal movement; means adapted to reverse the longitudinal movement of said shaft independently of its rotary movement and comprising stops secured to said shaft and a feed screw encircling said shaft and being loosely mounted thereon; a countershaft connected to rotate said feed screw to bring said screw into engagement with said stops; means adapted to drive the countershaft in opposite directions and comprising clutch members rotating in opposite directions; a trip rod operated by said feed screw; a lever operated by said trip rod and being adapted to alternately bring said clutch members into action; and means adapted to secure said lever in alternating positions to alternately hold said clutch members in engagement until the shaft has been moved a predetermined distance.

5. In combination with a shaft mounted for rotary and longitudinal movement; means adapted to reverse the longitudinal movement of said shaft and comprising a feed screw; a countershaft connected to rotate the feed screw and having clutch members adapted to be alternately brought into action to rotate said countershaft and operate said feed screw; means adapted to rotate said clutch members in opposite directions; a lever adapted to alternately bring said clutch members into action; a trip rod operated by said feed screw and adapted to operate said lever; and latch means to hold said lever in a clutch operating position until the shaft has been moved a predetermined distance.

6. In combination with a shaft mounted for rotary and longitudinal movement; means adapted to reverse the longitudinal movement of said shaft and comprising a feed screw; a countershaft connected to operate said feed screw and having clutch members adapted to be alternately brought into action to rotate said countershaft and operate said feed screw; means adapted to rotate said clutch members in opposite directions; a lever adapted to alternately bring said clutch members into action; a trip rod adapted to operate said lever; and means operated by said trip rod to hold said lever in operating position until the shaft has been moved a predetermined distance.

7. In combination, a drive shaft; a member mounted for rotary and endwise movement; means adapted to reverse the longitudinal movement of said member; said means comprising a counter shaft connected to rotate said member; clutch members on said counter shaft driven in opposite directions by said drive shaft; means to bring one of said clutch members into action to rotate said counter shaft; a trip rod operable by said member; a lever operable by said trip rod; and means adapted to hold said lever in a clutch operating position comprising keepers; latches pivotally connected to said lever and adapted to engage said keepers alternately; means to normally hold said latches toward the keepers; and trip means carried by said trip rod to disconnect said latches from the keepers when said member has been moved a predetermined distance in one direction.

In testimony whereof, I have hereunto set my hand at Los Angeles, California, this 8th day of April, 1922.

GEORGE CUSHING MARTIN.

Witness:
　JAMES R. TOWNSEND.